United States Patent Office 3,446,805
Patented May 27, 1969

3,446,805
7-ARYLTRIAZOLYL-3-ARYL-CARBOSTYRILS
Wolf-Dieter Wirth, Cologne-Stammheim, Hans Knupfer, Bergisch Neukirchen, and Carl-Wolfgang Schellhammer, Opladen, Germany, assignors to Farbenfabriken Bayer Aktiengesellschaft, Leverkusen, Germany, a corporation of Germany
No Drawing. Filed Aug. 1, 1967, Ser. No. 657,506
Claims priority, application Germany, Aug. 9, 1966,
F 49,910
Int. Cl. C07d *47/00, 33/34*
U.S. Cl. 260—247.2      4 Claims

ABSTRACT OF THE DISCLOSURE

Brightening agents of the formula

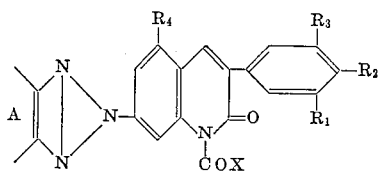

wherein $R_1$, $R_2$, and $R_3$ are hydrogen, alkyl of 1–12 carbon atoms, alkoxy, or halogen; $R_4$ is hydrogen or lower alkyl; X is alkoxy or substituted amino in which the substituents are alkyl of 1–18 carbon atoms, aryl, or aralkyl; and A is a substituted or unsubstituted fused mono- or polynuclear aromatic ring in which the substituents are alkyl or alkoxy.

The compounds can be prepared from the corresponding 7-amino-3-aryl-carbostyriles by diazotization, coupling the diazonium compound with a primary aromatic amine in the ortho-position to the primary amino group, oxidizing the o-amino azo compounds to the triazole and subsequently acylating to introduce the —COX grouping.

DISCLOSURE

The object of the present invention comprises brightening agents of the formula

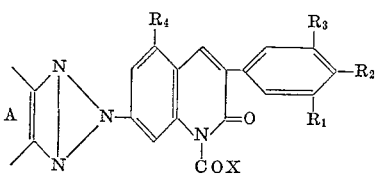

Therein $R_1$, $R_2$, and $R_3$, independently of one another, denote hydrogen, alkyl groups with 1–12 carbon atoms, alkoxy groups, such as methoxy or ethoxy groups, or halogen, such as chlorine or bromine, and $R_4$ stands for hydrogen or a lower alkyl group, such as methyl or ethyl, while X denotes alkoxy groups, such as methoxy or ethoxy, dialkylamino groups with alkyl radicals containing 1–18 carbon atoms or diarylamino, diaralkylamino, arylalkylamino, aralkyl-alkylamino or aralkyl-arylamino groups, and A stands for the residual members of a mono- or polynuclear aromatic ring system which is fused with the heterocyclic ring in the manner indicated and which may also be substituted, for example, by alkyl or alkoxy groups.

Preferred brightening agents are such of the above formula wherein A stands for the residual members of an optionally substituted benzene or naphthalene ring, especially such of the formula

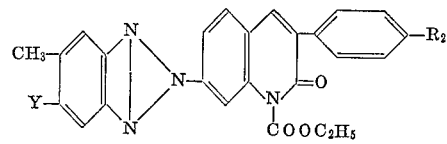

wherein Y stands for an alkyl or alkoxyalkyl residue, for example a residue $CH_3$, $C_2H_5$, $C_3H_7$, n-$C_4H_9$, $CH_3(CH_2)_7$, $CH_3(CH_2)_{11}$ or $C_2H_5OCH_2CH_2$ and $R_2$ denotes an alkyl or alkoxy group with 1–4 carbon atoms, for example a group $CH_3$, $C_2H_5$, $C_4H_9$, $OCH_3$, $OC_2H_5$ or $OC_4H_9$.

Further preferred brightening agents are such of the formula

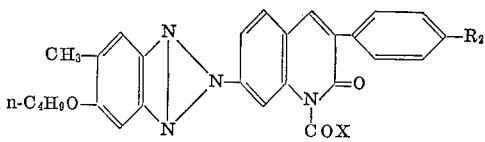

wherein $R_2$ has the meaning given above and X stands for a disubstituted amino group. As substituents may be mentioned alkyl, aralkyl and aryl groups, for example the residues $CH_3$, $C_2H_5$, $C_3H_7$, $C_4H_9$, $C_6H_5$, $C_6H_4CH_3$, $CH_2C_6H_5$, $C_6H_4OC_2H_5$. The alkyl groups may, optionally together with a further hetero atom, form a heterocyclic ring, for example the residue

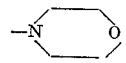

A further class of preferred brightening agents are those of the formula

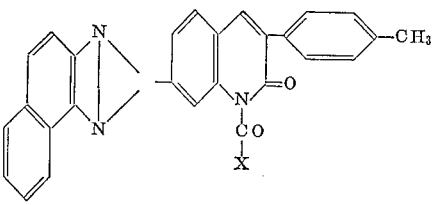

wherein X denotes an alkoxy group for example a group $OCH_3$, $OC_2H_5$ or $OC_4H_9$ or a disubstituted amino group as mentioned above.

The brightening agents of the present invention are suitable for brightening a great variety of materials, chiefly for brightening fibres, filaments, fabrics, knitted fabrics, foils or plastic masses of synthetic origin, especially for brightening materials of polyvinyl chloride or polyesters. They can be applied in the usual manner, for example, in the form of aqueous dispersions or in the form of solutions in organic solvents; if desired, they can also be used in combination with detergents or they can be added to synthetic materials serving for the production of foils or filaments. The amounts of brightening agent required in each case can easily be established by preliminary experiments; in general, amounts of 0.1–1%, referred to the weight of the material to be treated, will be sufficient.

The esters or amides of 7-aryltriazolyl-3-phenyl-carbostyrile-1-carboxylic acid to be used according to the invention as brightening agents can be obtained, for example, by diazotising 7-amino-3-phenyl-carbostyriles of the formula

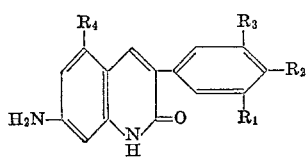

reacting the resultant diazonium salts with primary aromatic amines coupling in the ortho-position to the primary amino group, oxidising the o-aminoazo compounds so obtained to form triazole compounds of the formula

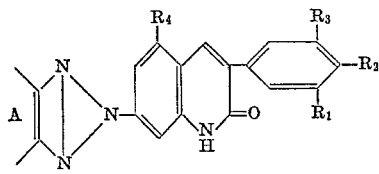

and subsequently reacting these with acylating derivatives of carbonic acid, for example, with chloroformic acid alkyl esters, pyrocarbonic acid esters or N,N-disubstituted carbamic acid chlorides, to form compounds of the formula

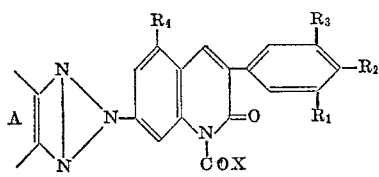

In these formulae, $R_1$–$R_4$, X and A have the same meaning as above.

The parts given in the following examples are parts by weight.

Example 1

65 parts polyvinyl chloride with a K-value of about 72–74, 35 parts dioctyl phthalate, 2 parts of a commercial organic tin compound serving for stabilisation of the polyvinyl chloride, 1 part titanium dioxide rutile and 0.1 part 7 - naphthotriazolyl-2'-3-(4''-methylphenyl)-1-di-n-butyl-carbamoyl-carbostyrile as brightening agent are rolled on a hot roller of low friction at 165–170° C. for 5 minutes; the rough sheet so obtained is then drawn off on a four-roll calender to produce a foil of about 300µ thickness. The foil is excellently brightened, the brightening effect has an excellent fastness to light.

The brightening agent used was prepared in the following manner: 25 parts 7-amino-3-(4'-methylphenyl)-carbostyrile of melting point 263–267° C. were dissolved in 400 parts glacial acetic acid while heating, the solution was cooled after the addition of 60 parts of concentrated hydrochloric acid, and the 7-amino-3-(4'-methylphenyl)-carbostyrile was diazotised at 0–5° C. with 6.9 parts sodium nitrite. A solution of 22 parts 2-naphthylamine hydrochloride in 150 parts glacial acetic acid was then added to the diazonium salt solution while stirring; the mixture was adjusted to a pH value of about 4 by the dropwise addition of a concentrated sodium hydroxide solution, and stirring was continued for several hours. The o-aminoazo compound formed was filtered off, washed with water, dried and suspended in 300 parts pyridine. The suspension was mixed with 50 parts copper acetate, heated at boiling temperature under reflux for one hour, and then cooled. The precipitated reaction product was filtered, washed with water and recrystallised from dimethyl formamide. 5 parts of the 7-naphthotriazolyl-2'-3-(4''-methylphenyl)-carbostyrile of melting point 340–345° C. were heated in a mixture of 75 parts 2,4,6-trimethyl-pyridine and 10 parts di-n-butyl-carbamic acid chloride at boiling temperature under reflux for 5 hours, and then cooled. The precipitated 7-naphthotriazolyl-2'-3-(4''-methylphenyl) - 1-di-n-butyl-carbamoyl-carbostyrile was filtered off and recrystallised from dimethyl formamide. Melting point 203 to 206° C.

Example 2

A mixture of 30 parts styrene and 70 parts of polyesters prepared from adipic acid and ethylene glycol is mixed with 2 parts of a 50% paste of cyclohexanone peroxide in dibutyl phthalate, 1 part titanium dioxide rutile and 0.2 parts 7-naphthotriazolyl-2'-3-(4''-methylphenyl)-1-di-n-butyl-carbamoyl-carbostyrile; the mixture is poured into a mould and hardened at about 90–100° C. The moulding thus formed is excellently brightened, the fastness to light of the brightening effect is excellent.

Example 3

1 part 7-naphthotriazolyl-2'-3-(4''-methylphenyl)-1-di-n-butyl-carbamoyl-carbostyrile is dissolved in a lacquer solution consisting of 165 parts of commercial collodium wool, 230 parts alcohol, 270 parts acetone, 270 parts ethylene glycol, 15 parts butanol, 25 parts dibutyl phthalate and 25 parts benzylbutyl phthalate. The lacquer solution is then poured on to a glass plate. The film thus formed is excellently brightened, the fastness to light of the brightening effect is excellent.

Example 4

65 parts cellulose acetate (acetyl value 55%), 35 parts dimethyl phthalate, 0.7 part titanium dioxide rutile and 0.1 part 7-naphthotriazolyl-2'-3-(4''-methylphenyl)-1-di-n-butyl-carbamoyl-carbostyrile are mixed with one another on hot rolls at 135–145° C. for about 4–7 minutes. The rough sheet so obtained is comminuted after cooling, and the granulate is moulded on an injection moulding machine. The mouldings so obtained are excellently brightened, the fastness to light of the brightening effect is excellent.

Example 5

A fabric of polyester fibres is padded with an aqueous dispersion containing, per litre, 1 g. 7-naphthotriazolyl-2'-3-(4'' - methylphenyl-1-di-n-butyl-carbamoyl-carbostyrile and 3 g. of a commercial anion-active dispersing agent. The fabric is then squeezed to a weight increase of 100%, then dried and heated at 180° C. for 20 seconds. The fabric thus treated exhibits a strong brightening effect of very good fastness to light.

Instead of the 7-naphthotriazolyl-2'-3-(4'''-methylphenyl)-1-di-n-butyl-carbamoyl-carbostyrile used in Examples 1–5, the esters or amides of 7-aryltriazolyl-3-phenyl-carbostyrile-1-carboxylic acid listed below in Tables I–III can also be used as brightening agents with equally good results.

In those cases where the brightening agent is to be introduced into the substrate with heating, it is recommended to use a mixture of two or more brightening agents, instead of one uniform brightening agent, since the mixtures can be more easily incorporated, due to the reduction of the melting point. As a suitable mixture there may be mentioned, for example, the mixture of equal parts of 7-naphthotriazolyl-2'-3-(4'''-methylphenyl)-1-di-n-butyl-carbamoyl-carbostyrile and 7-naphthotriazolyl - 2'-3-(4'''-methylphenyl-1-ethyl-tolyl-carbamoyl-carbostyrile.

TABLE I

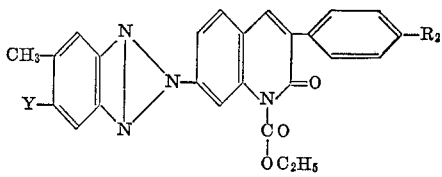

| $R_2$ | Y | Melting point (° C.) |
|---|---|---|
| H | $n-C_4H_9-$ | 198–201 |
| $CH_3$ | $i-C_3H_7-$ | 188–189 |
| $CH_3$ | $n-C_4H_9-$ | 185–187 |
| $CH_3$ | $i-C_4H_9-$ | 177–179 |
| $CH_3$ | $CH_3(CH_2)_7-$ | 125–127 |
| $CH_3$ | $CH_3(CH_2)_{11}-$ | 118–120 |
| $CH_3$ | $C_2H_5OCH_2CH_2-$ | 158–160 |
| $OCH_3$ | $CH_3-$ | 246–247 |
| $OCH_3$ | $C_2H_5$ | 208–210 |
| $OCH_3$ | $i-C_3H_7$ | 178–179 |
| $OCH_3$ | $n-C_4H_9-$ | 167–170 |
| $OCH_3$ | $i-C_4H_9-$ | 147–150 |
| $OCH_3$ | $CH_3(CH_2)_7-$ | 183–186 |
| $OCH_3$ | $CH_3(CH_2)_{11}-$ | 188 |
| $OCH_3$ | $C_2H_5OCH_2CH_2-$ | 140 |

TABLE II

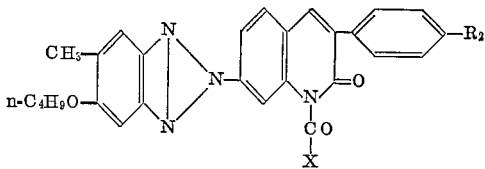

| $R_2$ | X | Melting point (° C.) |
|---|---|---|
| $CH_3$ | $N(CH_3)_2$ | 211–213 |
| $CH_3$ | $N(C_2H_5)_2$ | 221–225 |
| $CH_3$ | $N(n-C_4H_9)_2$ | 195–199 |
| $CH_3$ | $N(i-C_4H_9)_2$ | 193–197 |
| $CH_3$ | N(C_2H_5)(p-tolyl) | 165–168 |
| $CH_3$ | N(n-C_4H_9)(m-tolyl) | 181–185 |
| $CH_3$ | morpholino | 242–243 |
| $OCH_3$ | $N(n-C_4H_9)_2$ | 178–180 |
| $OCH_3$ | $N(CH_3)_2$ | 168–170 |

TABLE III

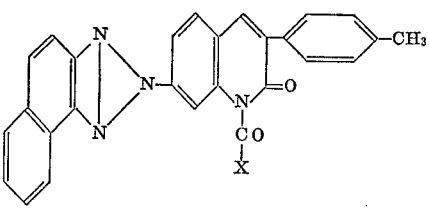

| X | Melting point (° C.) |
|---|---|
| $OC_2H_5$ | 240–242 |
| $N(CH_3)_2$ | 257–260 |
| $N(n-C_4H_9)_2$ | 203–206 |
| $N(i-C_4H_9)_2$ | 200–205 |
| $N(i-C_8H_{17})_2$ | 234–236 |
| $H_3C-N-CH_2(CH_2)_{16}CH_3$ | 164–167 |
| $H_3C-N-CH_2-\text{phenyl}$ | 242–244 |
| $H_5C_2-N-\text{phenyl}-CH_3$ | 208–211 |
| $N(\text{phenyl})_2$ | 276–279 |
| $H_3C-\text{phenyl}-N-\text{phenyl-OC}_2H_5$ | 193–195 |
| $N(CH_3)(o-tolyl)CH_2\text{-phenyl}$ | 211–214 |
| $N(CH_2\text{-phenyl})_2$ | 244–246 |
| morpholino | 265–267 |

These compounds can be obtained from 7-amino-3-phenyl-carbostryrile, 7-amino-3-(4'-methylphenyl)-carbostyrile and 7-amino-3-(4'-methoxyphenyl)-carbostyrile as well as from 4-amino-2-alkoxyl-1-methylbenzene, 4-amino-2-alkoxyalkyl-1-methylbenzene and 4-amino-2-alkyl-1-methyl-benzene or 2-napthylamine hydrochloride and chloroformic acid ethyl ester, pyrocarbonic acid diethyl ester or N,N-disubstituted carbamic acid chlorides according to the instructions given in Example 1.

We claim:

1. A compound of the formula

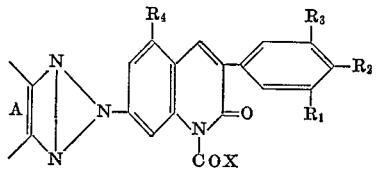

in which $R_1$, $R_2$, and $R_3$, independent of one another, linear, alkyl having 1–12 carbon atoms, alkoxy, or halogen; $R_4$ is hydrogen or lower alkyl; X is alkoxy or substituted amino in which the substituents are selected from the group consisting of phenyl, lower alkyl phenyl, lower alkoxyphenyl, benzyl, and alkyl having 1–18 carbon atoms; and A is a substituted or unsubstituted fused benzene or fused naphthalene, the substitutents being selected from the group consisting of alkyl, alkoxy, and alkoxyalkyl.

2. A compound of the formula

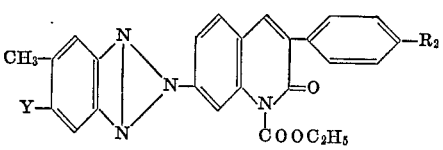

wherein Y is alkyl or alkoxyalkyl; and $R_2$ is alkyl or alkoxy having 1–4 carbon atoms.

3. A compound of the formula

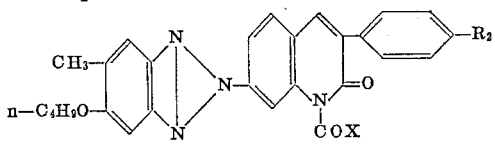

wherein $R_2$ is alkyl or alkoxy having 1–4 carbon atoms; and X is morpholino or substituted amino and in which said substituents are selected from the group consisting of phenyl, lower alkyl phenyl, lower alkoxyphenyl, benzyl, and alkyl having 1–18 carbon atoms.

4. A compound of the formula

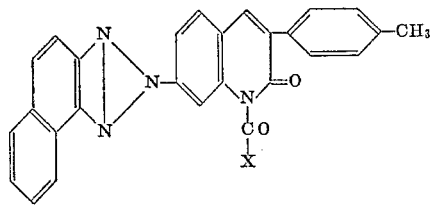

in which X is alkoxy, morpholino, or substituted amino in which said substituents are selected from the group consisting of phenyl, lower alkyl phenyl, lower alkoxyphenyl, benzyl, and alkyl having 1–18 carbon atoms.

References Cited

UNITED STATES PATENTS

| | | | |
|---|---|---|---|
| 3,341,530 | 9/1967 | Stroebel | 260—247.2 X |
| 2,901,485 | 8/1959 | Brody et al. | 260—288 |

FOREIGN PATENTS

| | | |
|---|---|---|
| 672,896 | 3/1966 | Belgium. |
| 679,188 | 10/1966 | Belgium. |

ALEX MAZEL, *Primary Examiner.*

D. G. DAUS, *Assistant Examiner.*

U.S. Cl. X.R.

260—287, 288, 308, 463, 544; 252—301.3